United States Patent [19]

Bauer

[11] Patent Number: 5,264,989
[45] Date of Patent: Nov. 23, 1993

[54] APPARATUS FOR TREATING THE SURFACE OF FORMED PLASTIC ARTICLES USING CORONA DISCHARGE

[76] Inventor: William S. Bauer, 3000 NE. 12th Terr., Ft. Lauderdale, Fla. 33334-4497

[21] Appl. No.: 715,759

[22] Filed: Jun. 14, 1991

[51] Int. Cl.$^5$ .............................................. H01T 19/00
[52] U.S. Cl. .................................... 361/225; 361/230; 264/26; 425/174.8 E
[58] Field of Search ................ 361/225, 229, 230-233, 361/383-384, 213; 250/324, 325; 264/26; 425/174.8 E; 55/129, 130, 136

[56] References Cited

U.S. PATENT DOCUMENTS

| | | | |
|---|---|---|---|
| 3,716,755 | 2/1973 | Marx | 361/229 |
| 3,862,420 | 1/1975 | Banks et al. | 250/324 |
| 4,153,560 | 5/1979 | Dinter et al. | 250/531 |
| 4,194,232 | 3/1980 | Cumming et al. | 361/230 X |
| 4,295,178 | 10/1981 | Spengler | 361/220 |
| 4,392,178 | 7/1983 | Radice | 361/233 |
| 4,724,508 | 2/1988 | Macy | 361/225 |
| 5,051,586 | 9/1991 | Sabreen | 250/324 |

Primary Examiner—A. D. Pellinen
Assistant Examiner—Fritz M. Fleming
Attorney, Agent, or Firm—Malin, Haley, DiMaggio & Crosby

[57] ABSTRACT

A device for treatment of formed plastic articles using a corona discharge and an air flow which is comprised of a pair of spaced apart hollow air flow housings, each defining a plurality of air flow passageways therein, a pair of electrode mounting plates adapted to house a plurality of spaced, staggered electrode pairs, one plate connected to each said housing, a treatment zone created by and between said mounting plates for the passage of work pieces therethrough, together with any suitable source of high voltage electricity to energize said electrodes and air induction and retrieval means for providing an air flow in said treatment zone. In a first embodiment of the invention, both housings are pressurized with a temperature controlled air flow which in turn passes through said air flow passageways through the mounting plates and around the electrodes, into the treatment zone. The air flow is retrieved by an evacuation apparatus located on the floor of the device directly below the treatment zone. In a second embodiment, both air flow housings are negatively pressurized to draw ambient air into the treatment zone, around the work pieces and electrodes, through the mounting plates and air flow passageways, where the air flow is exhausted through an appropriate exhaust apparatus.

11 Claims, 6 Drawing Sheets

APPARATUS FOR TREATING THE SURFACE OF FORMED PLASTIC ARTICLES USING CORONA DISCHARGE

BACKGROUND OF THE INVENTION

1. Field of the Invention

The instant invention relates to the surface treatment of plastic articles and, more particularly, relates to an improved apparatus for treating the surface of plastic articles so that the surface has enhanced printing and adhesion characteristics.

2. Description of the Prior Art

In the use of plastic materials for packaging, containers, tubular structures, medical products and a variety of other products and uses, it is desirable to print on the surface of these plastics. The most common approach for printing on the surface of plastics, such as polyethylene, involves printing inks. These inks, however, frequently have not satisfactorily adhered to the untreated surface of plastic articles onto which printing is desired. As a result, often not only was the quality of the printing poor, but the ink often could be readily rubbed off the surface of the article.

It has been discovered that treating the surface of the plastic would enhance printability and adhesion of the printing inks thereon, and that the use of a corona discharge treatment method was found to produce suitable results. To achieve such surface treatment by the corona discharge approach, the plastic material is introduced into a region of ionized air in a gap between two charged electrodes. High energy articles bombard the surface of the plastic material in the ionized region. Covalent bonds on the surface of the material are broken as a result of the particle bombardment energies developed in the ionized region. Free radicals that are formed on the surface rearrange to form functional groups which directly affect surface wetting and adhesion. Molecular transformations and dissociations may form species with a chemically altered surface favorable for adhesion. Increased adhesion is the result of an electrical formation induced in the polymeric material by the corona discharge. In short, the particle bombardment on the surface of the plastic material creates microfissures, increased porosity and polar groups which improve adhesion and surface wettability characteristics.

It is well known to treat the surface of polymeric films to enhance the wettability thereof using the corona discharge method. British Patent No. 765,545 discloses such a process in which the surface of a polyethylene or other plastic film is treated to rendor it receptive to receive printing ink and the like. U.S. Pat. No. 4,392,178 describes an apparatus for rapidly enhancing the piezoelectric properties of polar polymeric films by continuous corona poling thereof.

Others have conducted research or testing to correlate the effects of corona treatment and the increase in adhesion characteristics: Baum, et al., "Further Observations On The Decay of Surface Potential of Corona Charged Polyethylene Films," *J. Phys. D., Appl. Phys.*, Vol. 10, 1977, pp. 2525-2531; Carley, et al., "Corona-Discharge Treatment of Polyethylene Films. 1." *Polymer Engineering and Science*, March, 1978, Vol. 18, No. 4, pp. 326-334; Stadal, et al., "The Effect of Corona and Ozone Treatment on the Adhesion of Ink to the Surface of Polyethylene," *Polymer Engineering and Science*, January, 1977, Vol. 17, No. 1, pp. 38-41; and Ehrbar, et al., "Using Corona Discharge to Deglaze Plastic Films Before Metalizing," *Plating and Surface Finishing*, February 1980, pp. 64-66.

Treating the surface of formed plastic articles using a continuous corona discharge in an assembly line setting is disclosed in U.S. Pat. No. 4,724,508 to Macy wherein formed plastic work pieces are passed between a series of aligned, opposed electrode pairs, an air flow passed through the volume between said pairs of electrodes and the surface of said plastic articles thusly treated. A number of shortcomings, however, have been noted in the Macy system. Among them, firstly, is that the air flow in Macy is directed in such a way as to allow the escape of dangerous ozone into the atmosphere. Secondly, the direct alignment of the electrode pairs results in a corona field which yields less than 360° of uniform coverage over the surface of the work pieces. The use of directly opposed, as opposed to staggered, electrode positioning yields high and low intensity treatment areas on the work pieces due to the non-uniform geometry of some work pieces and the fact that the surfaces of the work pieces closest to the electrodes tend to become low intensity treatment areas as the transverse air flow passes along a line passing between electrode pairs. Thirdly, Macy uses a plurality of air flow manifolds which are placed side by side, allowing dangerous corona leakage from the interfaces of the respective manifolds.

It is also desirable to control the temperature of the air flow so as to control the temperature of the electrode and to control the heat generated by the electrodes to avoid failure of the dielectric electrode covering. Such failure creates a non-uniform corona field with hot spots which ultimately causes an electric arc.

SUMMARY OF THE INVENTION

The above-noted shortcomings in the prior art are overcome by a device for treatment of formed plastic articles using a corona discharge and an air flow which is comprised of a pair of spaced apart hollow air flow housings, each defining a plurality of air flow passageways therein, a pair of electrode mounting plates adapted to house a plurality of spaced, staggered electrode pairs, one plate connected to each said housing, a treatment zone created by and between said mounting plates for the passage of work pieces therethrough, together with any suitable source of high voltage electricity to energize said electrodes and air induction and retrieval means for providing an air flow in said treatment zone.

In a first embodiment of the invention, both housings are pressurized with a temperature controlled air flow which in turn passes through said air flow passageways through the mounting plates and around the electrodes, into the treatment zone. The air flow is retrieved by an evacuation apparatus located adjacent to the treatment zone. In a second embodiment, both air flow housings are negatively pressurized to draw ambient air into the treatment zone, around the work pieces and electrodes, through the mounting plates and air flow passageways, where the air flow is exhausted through an appropriate exhaust apparatus.

The opposed electrode pairs are staggered in the respective mounting plates so that the air flow direction is along a line other than a line between each electrode pair. A plurality of electrode pairs so oriented provides full 360° treatment over the periphery of the work pieces as they are passed through the treatment zone.

Other advantages and benefits of the present invention will become more apparent upon a reading of the detailed description which follows.

DETAILED DESCRIPTION OF THE PREFERRED EMBODIMENT

Figure 1:
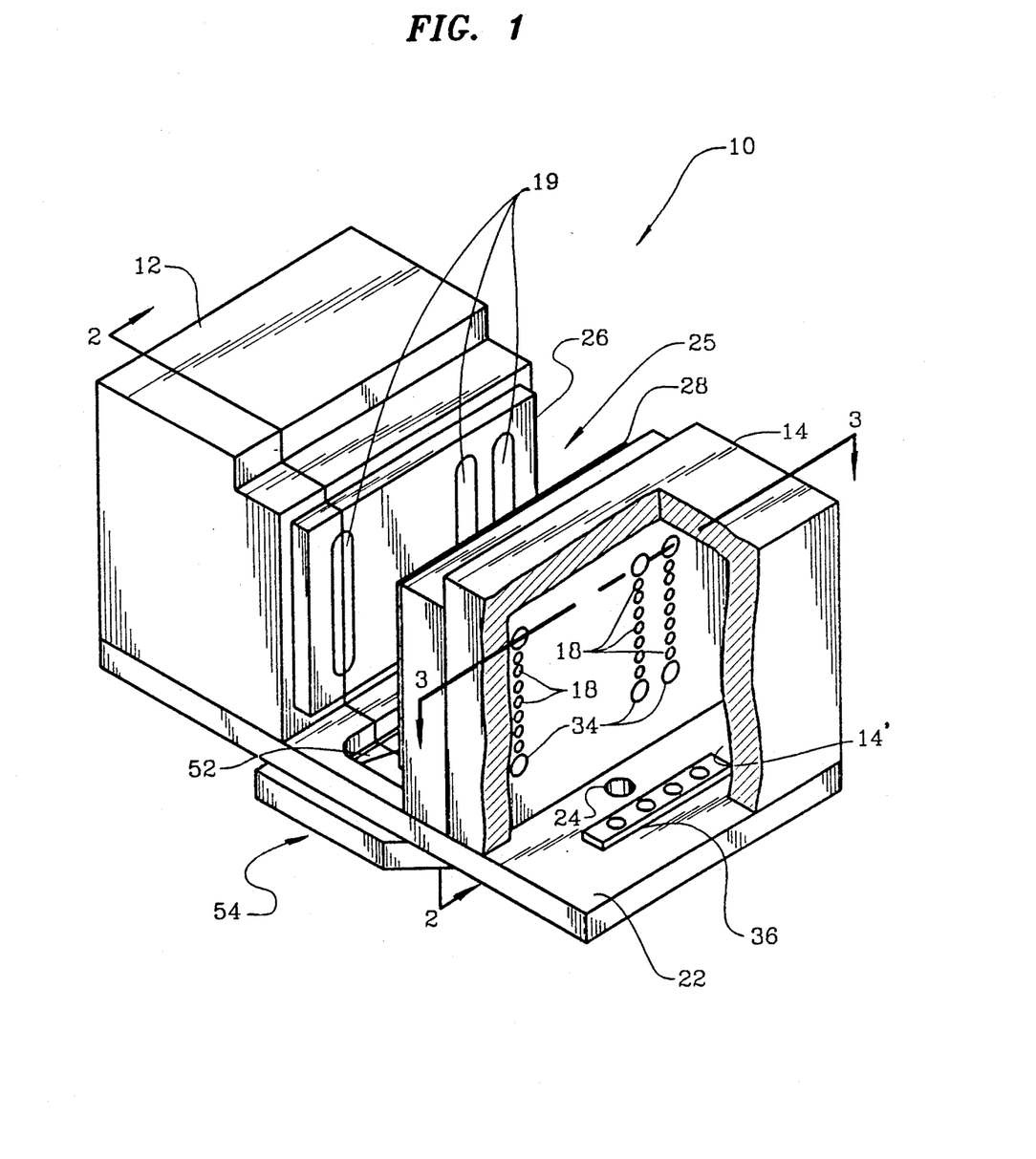
FIG. 1 is a perspective partial cutaway view of a first embodiment in the instant invention.
Figure 2:
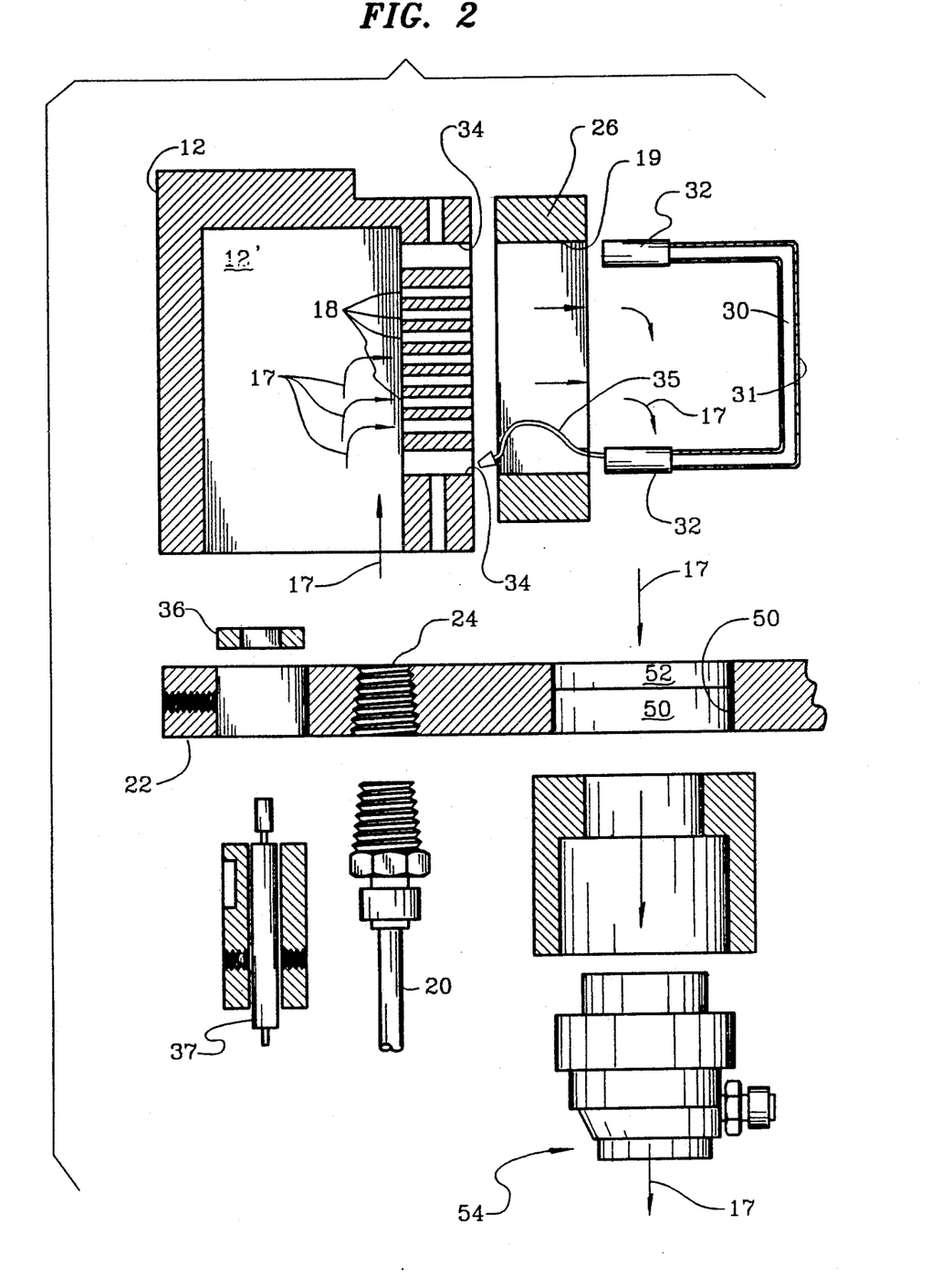
FIG. 2 is a cross-sectional exploded elevational view of a portion of the first embodiment of the instant invention showing one air housing, the exhaust apparatus and the direction of air flow therethrough.
Figure 3:
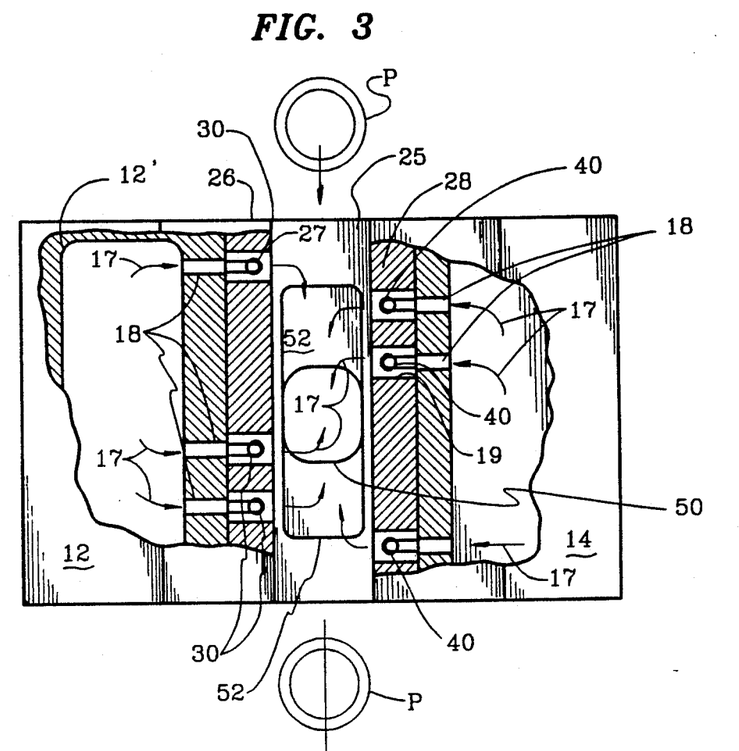
FIG. 3 is a partial cutaway plan view of the first embodiment in the instant invention.

Referring now to the drawings, FIGS. 1 through 3 show a first and preferred embodiment of an apparatus 10 where the surface treatment of formed plastic articles is carried out in accordance with the present invention. Apparatus 10 may take the shape of a box-like structure and includes a pair of spaced apart positive pressure housings 12 and 14 which form air flow chambers 12' and 14', respectively, therewithin. Both housings 12 and 14 are preferably formed as enclosures which house the electrical connection, circuitry and mounting for the electrodes of the apparatus as hereinafter described. In addition, both housings include an air injection means such as air injection nozzle 20 sealingly connected to floor 22 of the apparatus through aperture 24 so that air under pressure may be delivered to both housings of the apparatus. The magnitude of the air pressure delivered to pressurized air chambers 12', 14' may vary according to the particular air flow requirements of the particular treatment operation being performed.

As best seen in FIGS. 1 and 3, a treatment zone 25 is formed between electrode mounting plates 26 and 28, which mounting plates are connected to housings 12 and 14 respectively. Housing plates 26 and 28 assist in a more focused flow of the air 17 which emerges from air passageways 18 and protects the electrodes from possible damage. Each mounting plate defines a plurality of elongated cut-outs 19 sized and shaped to receive electrodes 30. Electrodes 30 are provided with dielectric protective coating material 31 and connector legs 32 adapted to be received by connector apertures 34 in housings 12 and 14. High voltage electric leads 35 electrically connect electrodes 30 and 40 with electric manifold 36, which in turn connects to external high voltage leads 37. Cutouts 19 are preferably oriented to correspond with the angle of orientation of the electrodes as described hereinafter.

Figure 4:
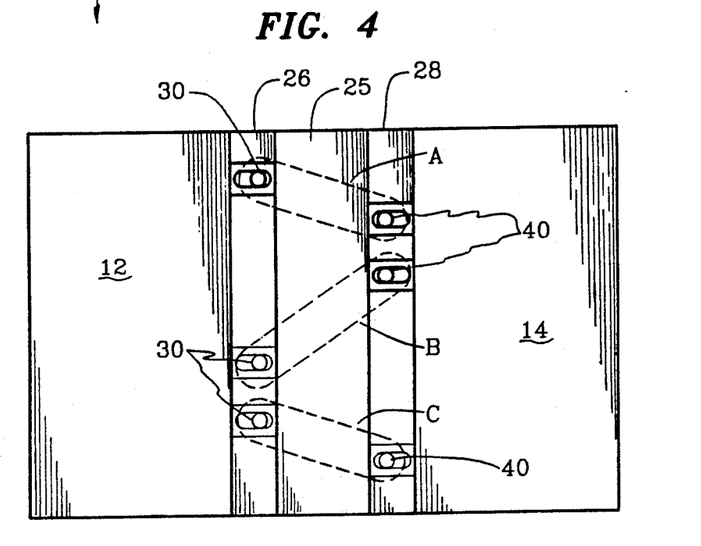
FIG. 4 is an illustrative representation of the approximate corona discharge field distribution between spaced, staggered electrode pairs of both embodiments of the instant invention.

As best seen in FIGS. 3 and 4, electrodes 30 and 40 are disposed in paired, staggered relation across treatment zone 25 with the first electrode of each pair connected to first housing 12 and the second electrode of each pair connected to second housing 14. With respect to each electrode pair, electrodes 30 are spaced in sufficiently close proximity to each other to produce a corona discharge field therebetween when the electrodes are electrically charged. In totality, the three electrode pairs, shown by way of example but not limitation, are employed to create a continuous corona field in the treatment zone 25. This close stacking of electrode pairs also provides a sufficiently high intensity corona field suitable for continuous treatment of articles P passing through the treatment zone. For example, the electrode pairs of the present invention may create a corona field having a watt density range between 20 watts per inch and 30 watts per inch which facilitates the treatment of most plastic surfaces envisioned by the present invention. The actual watt density depends upon the objects being treated and may be much larger, if appropriate. Further, the number of pairs of electrodes 30 and 40 may be increased or decreased depending upon the requirements of the particular application.

The depth of each plate 26, 28 is preferably designed so that the electrodes are shielded within cutouts 19 when the electrodes are positioned in holes 34 of housing 12 or 14.

In order to evacuate the air flow 17, which emerges from chambers 12', 14' through air passageways 18 and around electrodes 30 and 40, from treatment zone 25, an exhaust aperture 50 is provided in tapered floor section 52 of floor 22 of the apparatus. Connected to aperture 50 is an exhaust apparatus 54. Such exhaust apparatus is adapted to evacuate virtually all of the air within treatment zone 25 and thus capture substantially all of the ozone created during the corona treatment process before filtration and disposal.

In the embodiment being described, but without limitation, air passageways 18 are in fluid communication with pressurized air chambers 12', 14', and are in registry with electrodes 30 and 40. Air flow 17 from said chamber 12', 14' emerges through said air passageways 18 so that the air creates a uniform shroud or curtain around each electrode 30. From that point, air travels into the treatment zone and is exhausted through exhaust aperture 50. In this way, it can be seen that pressurized air is drawn from both chambers 12', 14' into treatment zone 25 and out exhaust apparatus 54. Air travelling in this way removes heat from each electrode that is developed during operation. To facilitate the withdrawal of air through exhaust apparatus 54, a vacuum is provided through aperture 50. The air flow through the apparatus 10 may be regulated as needed. For purposes of the present invention, it is desirable to cause air to flow from cutouts 19 into treatment zone 25 and out aperture 50 at a rate between 25 and 100 cubic feet per minute.

Figure 5:
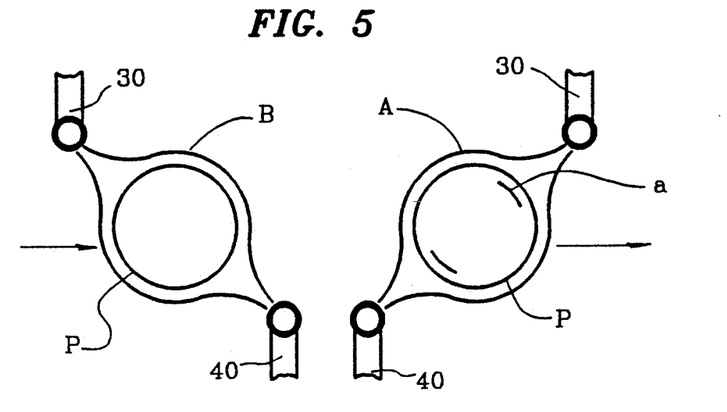
FIG. 5 is an illustrative representation of the corona field distribution intensity about a work piece passing through the treatment zone.

Air flow from the air pressure chambers 12', 14' facilitates the creation of a uniform corona field for the surface treatment of articles P passing therethrough. Because of the staggered but parallel positioning of the electrode pairs 30 and 40, the corona field generated is disposed along a line which is, in a preferred embodiment, oriented at the preferred angle of 45° with respect to the line of travel of the work pieces P through the treatment zone 25. Because of this orientation, the work pieces P are exposed to the corona field for a longer duration and are also exposed to corona fields oriented 90° one from the other. Because of this, any low intensity treatment zone "a" resulting after work piece P travels through the first corona field A gets additionally treated upon passage through second corona field B because those fields are oriented at right angles to each other, and any low intensity treatment zone resulting after workpiece P travels through the second corona field B gets additionally treated upon passage through third corona field C. Therefore, as shown in FIG. 5, the entire 360° periphery of work pieces P are treated uniformly. Any low intensity treatment areas "a" which would otherwise result from the orientation of corona field A will be treated when the work piece passes through corona field B.

Figure 7:
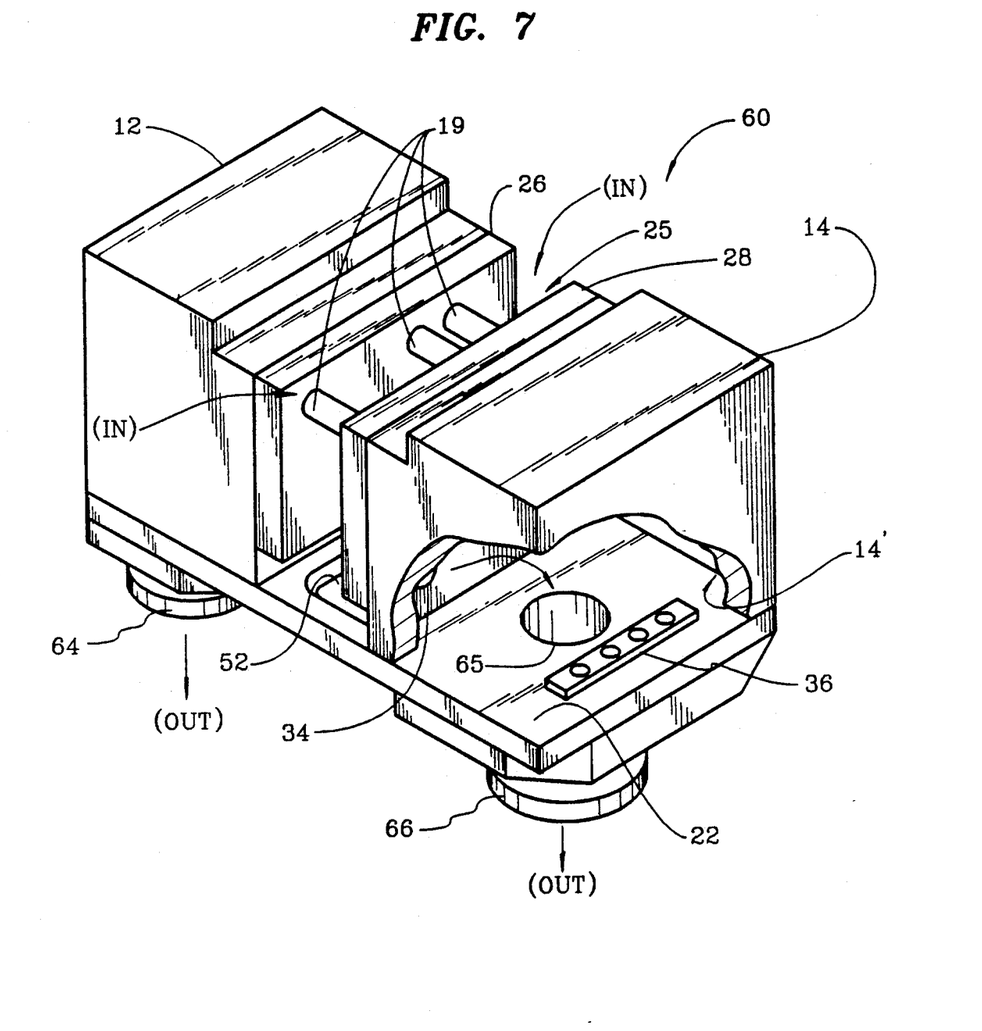
FIG. 7 is a perspective partial cutaway view of the second embodiment of the instant invention, showing an angular orientation of the electrodes.

It is understood that while vertical orientation of the electrodes is preferred, the principles of the present invention will also be satisfied if the electrodes are mounted in some other orientation, such as angular orientation as shown in FIG. 7.

Figure 6:
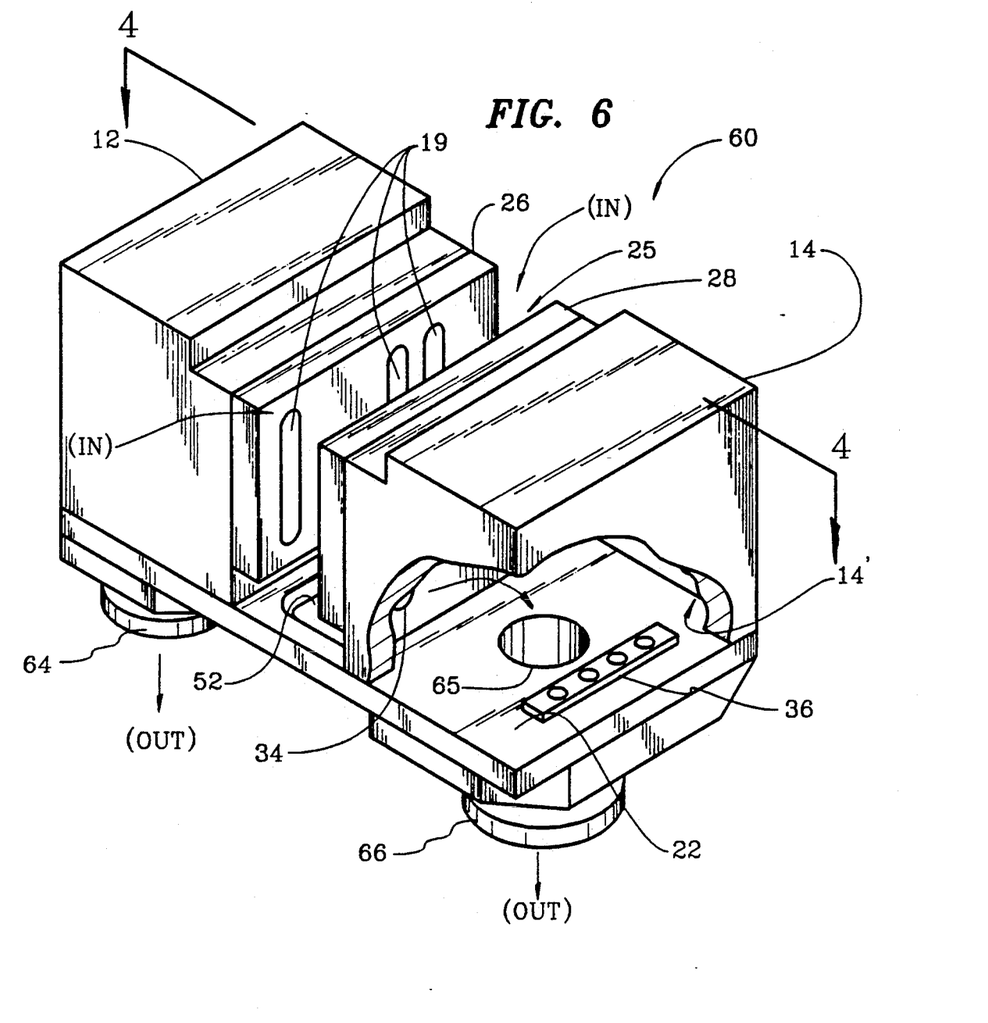
FIG. 6 is a perspective partial cutaway view of the second embodiment of the instant invention.

Referring now to FIG. 6, a second embodiment of the treatment apparatus 60 is illustrated in accordance with this invention. Instead of injecting air into chambers 12', 14' of housing 12, 14 respectively, air is exhausted from each said chamber 12', 14' via exhaust apparatus 64, 66 through apertures 63 (not shown) and 65 in housings 12', 14' respectively, in any suitable manner. In this way, treatment air is drawn from the surrounding environment (IN) into treatment zone 25, around electrodes 30, through air passageways 18 into chambers 12', 14' and exhausted (OUT). By so orienting the air flow, virtually all ambient air which may be contaminated by ozone is captured for filtering. In prior art devices, ozone-rich treatment air, although being exposed to negative pressure, has still been permitted to escape in appreciable amounts By the use of one piece pressurized air housings 12, 14, instead of the individual cartridges of the prior art, cooling of said housings is made substantially easier and uniform. Perhaps more importantly, corona and high voltage discharge leaks are kept to a minimum by reducing the number of interfaces which a plurality of individual pressurized air housings presents. Because of the extremely high voltages involved in operation of corona discharge devices, an increase in the safety factor decreases the likelihood of injuries occasioned by corona leakage.

Figure 8:
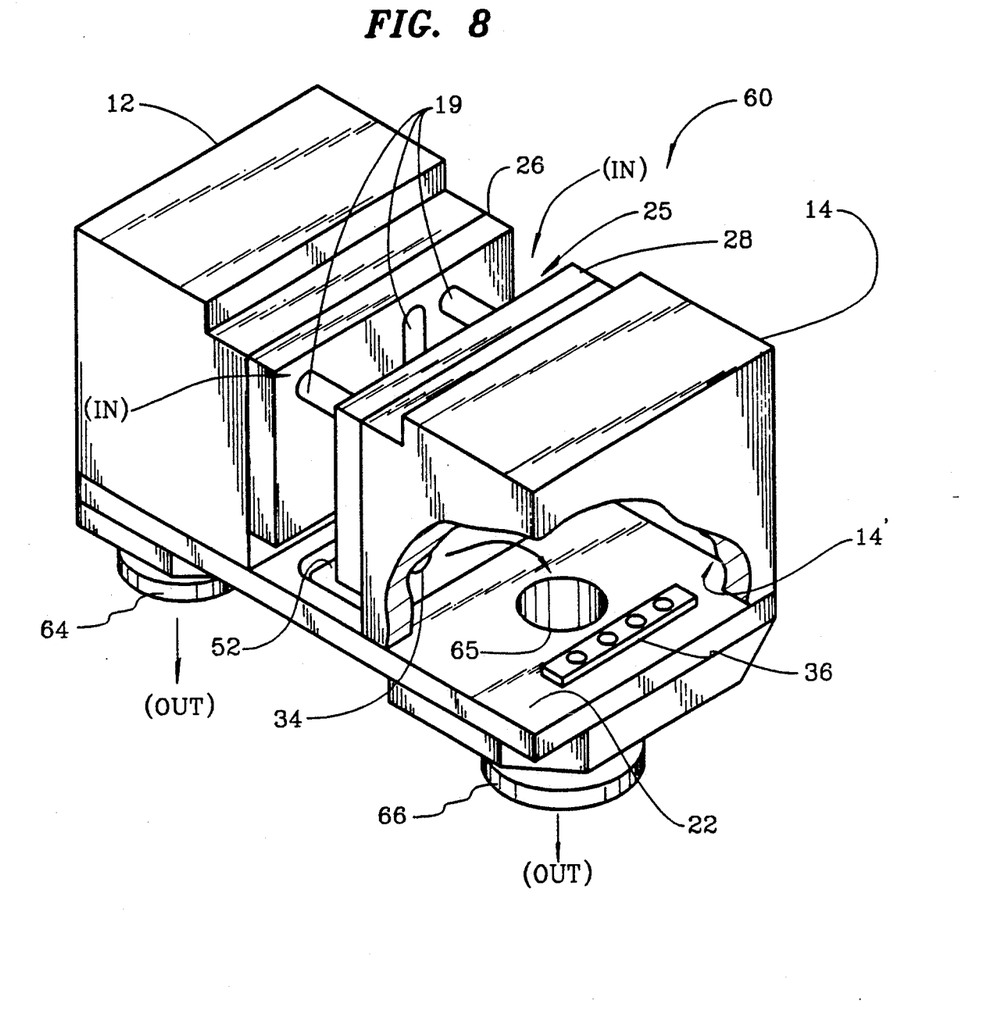
FIG. 8 is a perspective partial cutaway view of a third embodiment of the instant invention, showing a nonuniform orientation of the electrodes.

It is understood that while parallel vertical or angular orientation of the electrodes is satisfactory, the principles of the present invention will also be satisfied if the electrodes are mounted in non-parallel relationship to one another, such as the orientation shown in FIG. 8.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An apparatus for treating the surface of formed plastic articles, comprising:
    a pair of housings spaced apart and defining a treatment zone therebetween;
    a plurality of electrode pairs, the first member of said pairs connected to one housing, the second member of said pairs connected to the second housing, said electrode pairs being spaced apart across the said treatment zone, each said electrode pair adapted to create a corona discharge field therebetween when energized;
    means for introducing a flow of air from both housings into the treatment zone;
    means for removing said flow of air from said treatment zone connected adjacent said treatment zone, inducing said flow of air from each housing through said treatment zone and into said means for removing; wherein when formed plastic articles having a peripheral surface are moved in a continuous motion through said corona field in said treatment zone, said corona field and said means for introducing cooperate to circumscribe the peripheral surface of the article whereby the corona discharge causes molecular modification of said surface.

2. The apparatus of claim 1, wherein each said electrode pair members are staggered one from the other on opposite sides of said treatment zone with respect to the direction of article movement through said zone, whereby each successive corona discharge field is oriented at approximately 90° to the preceding field with respect to the article orientation and modification.

3. The apparatus of claim 2, wherein said electrodes may be oriented in any plane and said articles move through said treatment zone.

4. The apparatus of claim 1, wherein said means for introducing air includes a plurality of air flow passageways communicating a source of pressurized air within both said housings with said treatment zone whereby air is caused to flow across said electrodes into said treatment zone.

5. An apparatus for treating the surface of formed plastic articles comprising a pair of hollow housings spaced one from the other and forming a treatment zone therebetween; means for evacuating air within each said housing associated with each said housing; means for permitting the introduction of ambient air into said housings communicating the treatment zone with the interior of said housings, resulting in an air flow directed from said treatment zone through each housing; a plurality of pairs of electrodes, each pair including one electrode positioned in one housing and the other electrode positioned in the other housing, electrodes of each pair located in sufficiently close proximity to each other to produce a corona discharge field therebetween, and each pair of electrodes being staggered with respect to the direction of article movement through said zone so that said corona discharge field is established between opposing electrodes at an angle other than 90° with respect to said direction of movement of the articles, said electrodes being oriented generally vertically whereby the corona discharge causes molecular modification of said surface.

6. The apparatus of claim 5, wherein each of said one electrodes of said pairs of electrodes is positioned in a first mounting plate, and each of said other electrodes of said pairs of electrodes are positioned in a second mounting plate, said mounting plates defining a plurality of air flow passageways which comprise said means for permitting.

7. The apparatus of claim 6, wherein said plurality of air flow passageways are in registry with said electrodes.

8. An apparatus for treating the surface of formed plastic articles comprising a pair of housings spaced one from the other and defining a treatment zone therebetween; means for introducing a supply of pressurized air to the interior of both said housings; a plurality of pairs of electrodes, each pair including one electrode connected to one of said housings and the other electrode positioned in the other of said housings, electrodes of each pair located in sufficiently close proximity to each other to produce a corona discharge field therebetween, said one electrode of said pairs of electrodes being staggered in relationship to said other electrode with respect to the direction of article movement through said zone so that said corona discharge field of each of said pairs of electrodes is oriented at an angle other than 90° with respect to said direction of movement; means for drawing air from the interior of said housings and through said treatment zone positioned adjacent said treatment zone resulting in an airflow directed from each housing through said treatment zone and into said means for drawing; means fluidly communicating the interior of said housings with said treatment zone associated with said housings; said electrodes being oriented generally vertically; whereby when a formed plastic article having a peripheral surface is moved through said corona field in the treatment zone in a continuous motion, said electrodes and air flowing from said housings to said means for drawing cooperate to cause the charged field to circumscribe the peripheral surface of the article whereby the corona discharge causes molecular modification of said surface.

9. The apparatus of claim 8, wherein said plurality of air flow passageways are in registry with said electrodes.

10. An apparatus for treating the surface of formed plastic articles comprising a pair of housings spaced one from the other and defining a treatment zone therebetween; means for introducing a supply of pressurized air to the interior of said housings; a plurality of pairs of electrodes, each pair including one electrode connected to one of said housings and the other electrode connected to the other of said housings, electrodes of each pair located in sufficiently close proximity to each other to produce a corona discharge field therebetween, said one electrode of said pairs of electrodes being staggered in relationship to said other electrode with respect to the direction of article movement through said zone so that said corona discharge field of each of said pairs of electrodes is oriented at an angle other than 90° with respect to said direction of movement; means for drawing air from the interior of said housings and through said treatment zone positioned adjacent said treatment zone resulting in an airflow directed from each housing through said treatment zone and into said means for drawing; means fluidly communicating the interior of said housings with said treatment zone associated with said housings; whereby when a formed plastic article having a peripheral surface is moved through said corona field in the treatment zone in a continuous motion, said electrodes and air flowing from said housings to said means for drawing cooperate to cause the charged field to circumscribe the peripheral surface of the article whereby the corona discharge causes molecular modification of said surface.

11. The apparatus of claim 10 wherein said electrodes are oriented generally vertically.

* * * * *